(12) United States Patent
Chang et al.

(10) Patent No.: US 11,654,771 B1
(45) Date of Patent: May 23, 2023

(54) MULTI-VIEW DISPLAY DEVICE FOR A CO-PILOT APPLICATION OF A MOTOR VEHICLE

(71) Applicant: GM Global Technology Operations LLC, Detroit, MI (US)

(72) Inventors: Kai-Han Chang, Sterling Heights, MI (US); Thomas A. Seder, Fraser, MI (US); Joseph F. Szczerba, Grand Blanc, MI (US); John P. Weiss, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/813,794

(22) Filed: Jul. 20, 2022

(51) Int. Cl.
*G01C 21/36* (2006.01)
*B60K 35/00* (2006.01)
*G02B 27/01* (2006.01)

(52) U.S. Cl.
CPC .......... *B60K 35/00* (2013.01); *G02B 27/0101* (2013.01); *G02B 27/0179* (2013.01); *B60K 2370/149* (2019.05); *B60K 2370/1529* (2019.05); *B60K 2370/334* (2019.05); *G02B 2027/0138* (2013.01); *G02B 2027/0181* (2013.01); *G02B 2027/0187* (2013.01)

(58) Field of Classification Search
CPC .............. G02B 27/017; B60K 2370/1529
See application file for complete search history.

(56) References Cited

U.S. PATENT DOCUMENTS

| | | | |
|---|---|---|---|
| 9,057,874 B2 | 6/2015 | Seder et al. | |
| 10,747,314 B1 | 8/2020 | Chang et al. | |
| 10,860,093 B1 | 12/2020 | Chang et al. | |
| 10,880,529 B2 | 12/2020 | Chang et al. | |
| 10,926,638 B1 | 2/2021 | Chang et al. | |
| 11,024,056 B2 | 6/2021 | Chang et al. | |
| 11,106,044 B2 | 8/2021 | Seder et al. | |
| 11,135,881 B2 | 10/2021 | Hall et al. | |
| 2010/0164702 A1* | 7/2010 | Sasaki | G01B 21/22 345/7 |
| 2014/0362195 A1 | 12/2014 | Ng-Thow-Hing et al. | |

(Continued)

OTHER PUBLICATIONS

U.S. Appl. No. 17/714,410, filed Apr. 6, 2022, John P. Weiss.
U.S. Appl. No. 17/714,418, filed Apr. 6, 2022, John P. Weiss.
U.S. Appl. No. 17/813,781, filed Jul. 20, 2022, Manoj Sharma.

*Primary Examiner* — Nan-Ying Yang
(74) *Attorney, Agent, or Firm* — Vivacqua Crane PLLC

(57) ABSTRACT

A multi-view display device is provided for a collaborative co-pilot system (system) of a vehicle having a windshield. The system includes one or more input devices for generating an input signal associated with a road condition. The multi-view display device includes one or more single-user viewing devices, with each single-user viewing device including an Augmented Reality Head Up Display module (ARHUD) for generating a dedicated display associated with the road condition. The ARHUD projects the dedicated display onto an associated portion of the windshield that is visible to a corresponding single user and overlaying a road geometry associated with the road condition. The multi-view display device further includes an Extended View Display module (EV display module) for generating a common display that is visible to a plurality of users including each one of the single users.

20 Claims, 7 Drawing Sheets

(56) References Cited

U.S. PATENT DOCUMENTS

| | | |
|---|---|---|
| 2016/0059855 A1 | 3/2016 | Rebhan et al. |
| 2019/0233034 A1 | 8/2019 | Viele et al. |
| 2020/0355512 A1* | 11/2020 | Cho .................... G01C 21/365 |
| 2022/0044032 A1 | 2/2022 | Baltaxe et al. |
| 2022/0066211 A1 | 3/2022 | Seder et al. |

* cited by examiner

MULTI-VIEW DISPLAY DEVICE FOR A CO-PILOT APPLICATION OF A MOTOR VEHICLE

INTRODUCTION

The present disclosure relates to display systems that provide information to multiple users positioned within a vehicle, and more particularly to a multi-view display device that enables a co-pilot application to display collaborative information to multiple users (e.g., a driver and a passenger) and further to display other information that is visible to a single intended user (e.g., the driver).

Automotive manufacturers are continuously developing systems for efficiently presenting information to a driver of a vehicle. These systems can project light (e.g., graphics or other information) onto a screen that is positioned between the driver and a windshield. However, a passenger (e.g., a front-seat passenger) may not have a line of sight to the screen that allows the passenger to accurately view the information projected on the screen. In addition, while the information projected onto the screen may be associated with a road geometry that is visible through the windshield, the information may not overlay the road geometry from the perspective of the passenger, such that the passenger may require time to determine the road geometry associated with the displayed information. As a result, the front-seat passenger ay not efficiently collaborate with the driver to perform an in-vehicle activity.

Thus, while existing display systems of vehicles may achieve their intended purpose, there is a need for a new and improved display system that addresses these issues.

SUMMARY

According to several aspects of the present disclosure, a multi-view display device is provided for a collaborative co-pilot system (system) of a vehicle having a windshield. The system includes one or more input devices for generating an input signal indicative of data associated with the vehicle, a road condition, another vehicle, and/or a Vulnerable Road User. The multi-view display device includes one or more single-user viewing devices. Each single-user viewing device has an Augmented Reality Head Up Display module (ARHUD) for generating a dedicated display associated with the road condition. The ARHUD projects the dedicated display onto a portion of the windshield, which is visible to a corresponding single user and overlays a road geometry associated with the road condition. The multi-view display device further includes an Extended View Display module (EV display module) for generating a common display, which is visible to multiple users including each one of the single users. The multi-view display device further includes a computer having one or more processors electrically communicating with the input device, the single-user viewing device, and the EV display module. The computer further includes a non-transitory computer readable storage medium (CRM) storing instructions, such that the processor is programmed to receive the input signal from the input device. The processor is further programmed to generate a dedicated actuation signal and a common actuation signal, in response to the processor receiving the input signal from the input device. The ARHUD projects the dedicated display onto the windshield, in response to the ARHUD receiving the dedicated actuation signal from the processor. The EV display module projects the common display onto the windshield, in response to the EV display module receiving the common actuation signal from the processor.

In one aspect, the multi-view display device further includes a road detection module for generating a road signal. The road signal is associated with the road geometry that is visible through the windshield and located within a field of view of the corresponding single users.

In another aspect, each single-user viewing device includes an eye tracker device for generating a user signal, which is associated with a location of an eye of the corresponding single user. The processor is programmed to receive the user signal from the eye tracker device. The processor is further programmed to determine a dedicated section of the windshield that overlays the road geometry associated with the road condition, in response to the processor receiving the road signal from the road detection module and the user signal from the eye tracker device. The processor is further programmed to generate the dedicated actuation signal, in response to the processor determining the dedicated section of the windshield that overlays the road geometry. The ARHUD projects the dedicated display onto the dedicated section, in response to the ARHUD receiving the dedicated actuation signal from the processor.

In another aspect, the ARHUD is configured to generate the dedicated display including a notification symbol, in response to the ARHUD receiving the dedicated actuation signal from the processor. The notification symbol is associated with the road condition. The dedicated display is configured to display the notification symbol within a far-field image plane of the windshield and information regarding the notification symbol within a near-field image plane of the windshield.

In another aspect, the EV display module is configured to project the common display including first and second colors directed to associated first and second users.

In another aspect, the EV display module is configured to project the common display including one or more annotations that provide a notification directed to one of the users.

In another aspect, the EV display module includes a phosphor film adapted to be applied to the windshield. The EV display module further includes an ultraviolet laser device (UV laser device) with a microelectromechanical system scanner (MEMS scanner), and the UV laser device projects the common display onto the phosphor film.

According to several aspects of the present disclosure, a collaborative co-pilot system (system) is provided for a vehicle. The system includes a windshield and one or more input devices for generating an input signal indicative of data associated with the vehicle, a road condition, another vehicle, and/or a Vulnerable Road User. The system further includes a multi-view display device having one or more single-user viewing devices. Each single-user viewing device includes an Augmented Reality Head Up Display module (ARHUD) for generating a dedicated display associated with the road condition. The ARHUD projects the dedicated display onto a portion of the windshield, which is visible to a corresponding single user and overlays a road geometry that is associated with the road condition. The multi-view display device further includes an Extended View Display module (EV display module) for generating a common display, which is visible to multiple users including each one of the single users. The multi-view display device further includes a computer having one or more processors electrically communicating with the input device, the single-user viewing device, and the EV display module. The computer further includes a non-transitory computer readable storage medium (CRM) storing instructions, such that the processor is programmed to receive the input signal from the input device. The processor is further programmed to generate a dedicated actuation signal and a common actuation signal, in response to the processor receiving the input signal from the input device. The ARHUD projects the dedicated display onto the windshield, in response to the ARHUD receiving the dedicated actuation signal from the processor. The EV display module projects the common display onto the windshield, in response to the EV display module receiving the common actuation signal from the processor.

In one aspect, the EV display module is configured to display the common project on a common section of the windshield, with the common section being spaced a common distance from at least two of the users.

In another aspect, the multi-view display device further includes a road detection module for generating a road signal. The road signal is associated with the road geometry that is visible through the windshield and located within a field of view of the corresponding single users.

In another aspect, each single-user viewing device includes an eye tracker device for generating a user signal, which is associated with a location of an eye of the corresponding single user. The processor is programmed to receive the user signal from the eye tracker device. The processor is further programmed to determine a dedicated section of the windshield that overlays the road geometry associated with the road condition, in response to the processor receiving the road signal from the road detection module and the user signal from the eye tracker device. The processor is further programmed to generate the dedicated actuation signal, in response to the processor determining the dedicated section of the windshield that overlays the road geometry. The ARHUD projects the dedicated display onto the dedicated section, in response to the ARHUD receiving the dedicated actuation signal from the processor.

In another aspect, the ARHUD is configured to generate the dedicated display including a notification symbol, in response to the ARHUD receiving the dedicated actuation signal from the processor. The notification symbol is associated with the road condition. The dedicated display is configured to display the notification symbol within a far-field image plane of the windshield and information regarding the notification symbol within a near-field image plane of the windshield.

In another aspect, the EV display module is configured to project the common display including first and second colors to provide first and second notifications to associated first and second users.

In another aspect, the EV display module is configured to project the common display including one or more annotations to provide a notification directed to one of the users.

In another aspect, the EV display module includes a phosphor film adapted to be applied to the windshield. The EV display module further includes an ultraviolet laser device (UV laser device) with a microelectromechanical system scanner (MEMS scanner), and the UV laser device projects the common display onto the phosphor film.

According to several aspects of the present disclosure, a method is provided for operating a multi-view display device of a collaborative co-pilot system (system) of a vehicle. The system includes a windshield, one or more input devices, and a multi-view display device. The multi-view display device includes one or more single-user viewing devices. Each single-user viewing device has an Augmented Reality Head Up Display module (ARHUD). The multi-view display device further includes an Extended View Display module (EV display module) and a computer, which has one or more processors and a non-transitory computer readable storage medium (CRM) storing instructions. The method includes generating, using the input device, an input signal indicative of data associated with the vehicle, a road condition, another vehicle, and/or a Vulnerable Road User. The method further includes generating, using the ARHUD, a dedicated display associated with the road condition. The method further includes generating, using the EV display module, a common display associated with the road condition. The method further includes receiving, using the processor, the input signal from the input device. The method further includes generating, using the processor, a dedicated actuation signal and a common actuation signal in response to the processor receiving the input signal from the input device. The method further includes projecting, using the ARHUD, the dedicated display onto an associated portion of the windshield, which is visible to a corresponding single user. The dedicated display overlays a road geometry associated with the road condition, in response to the ARHUD receiving the dedicated actuation signal from the processor. The method further includes projecting, using the EV display module, the common display onto a portion of the windshield that is visible to multiple users including each one of the single users, in response to the EV display module receiving the common actuation signal from the processor.

In one aspect, the method further includes displaying, using the EV display module, the common display on a common section of the windshield spaced a common distance from two or more of the users.

In another aspect, the method further includes generating, using a road detection module, a road signal associated with the road geometry that is visible through the windshield and located within a field of view of the corresponding single users.

In another aspect, the method further includes generating, using an eye tracker device of the single-user viewing device, a dedicated user signal associated with a location of an eye of the corresponding single user. The method further includes receiving, using the processor, the user signal from the eye tracker device. The method further includes determining, using the processor, a dedicated section of the windshield that overlays the road geometry associated with the road condition in response to the processor receiving the road signal from the road detection module and the user signal from the eye tracker device. The method further includes generating, using the processor, the dedicated actuation signal in response to the processor determining the dedicated section of the windshield. The method further includes projecting, using the ARHUD, the dedicated display onto the dedicated section of the windshield that overlays the associated road geometry in response to the ARHUD receiving the dedicated actuation signal from the processor.

In another aspect, the method further includes projecting, using the EV display module, the common display including multiple colors, with the colors providing a notification to an associated one of the users. The method further includes projecting, using the EV display module, the common display including one or more annotations for providing a notification directed to one of the users.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
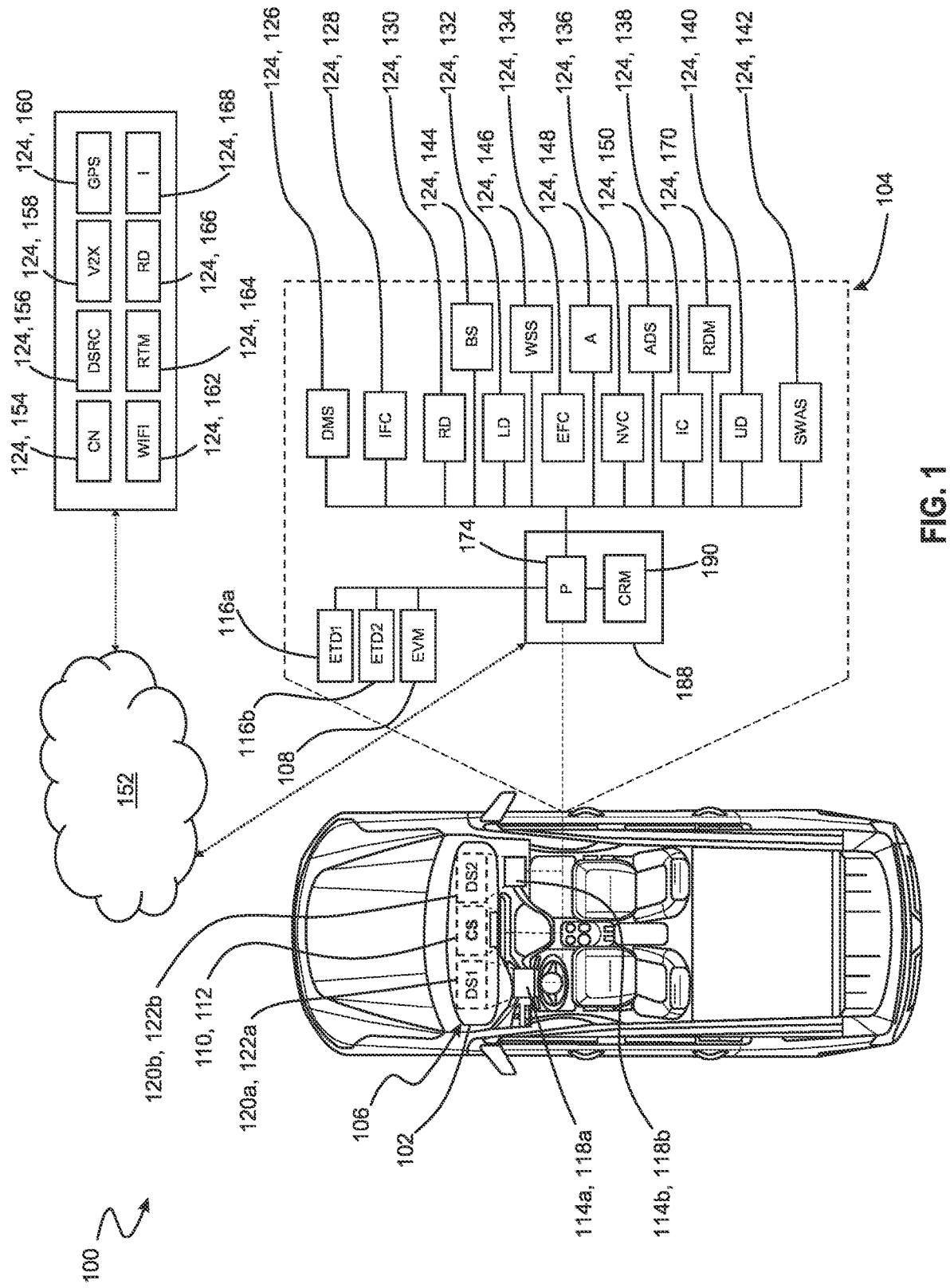
FIG. 1 is a schematic diagram of one example of a vehicle having a collaborative display system including a multi-view display device with an Extended View Display module (EV display) for two users and two Augmented Head Up Display modules (ARHUDs) with two associated eye tracker devices for an associated one of two users.

Referring to FIG. 1, one example of a vehicle 100 includes a windshield 102 and a collaborative display system 104 (system) for one or more co-pilot applications. The co-pilot application (e.g., a navigation application, a parallel parking assist application, a driver education application, an automated driver information application, a collision warning application, an infotainment application, etc.) can display information or graphics that enable two or more users to collaborate with one another to perform an activity (e.g., travel along a route or to a location that is new to a driver and a front-seat passenger; parallel park the vehicle; avoid a predicted collision with a Vulnerable Road User, another vehicle, and/or a road barrier; watch a video when the vehicle is parked; etc.). As described in detail below, the system 104 includes a multi-view display device 106, which has an Extended View Display module 108 (EV Display module) for projecting a common display 110 onto a common section 112 of the windshield 102 of the vehicle 100. The common display 110 is viewable by multiple users (e.g., a driver and a passenger), such that the users can concurrently view the common display 110 and collaborate with one another to perform the activity. Also, in this non-limiting example as described in detail below, the multi-view display device 106 further includes one or more single-user viewing devices (e.g., first and second single-user viewing devices 114a, 114b). Each of the first and second single-user viewing devices 114a, 114b includes an associated one of eye tracker devices 116a, 116b for determining a location of an eye of associated first and second users. Each of the first and second single-user viewing devices 114a, 114b further includes associated first and second Augmented Reality Head Up Display modules 118a, 118b (ARHUD) for displaying first and second dedicated displays 120a, 120b onto an associated one of first and second dedicated sections 122a, 122b of the windshield 102. The first and second dedicated sections 122a, 122b overlay a road geometry associated with a road condition and are based on the location of the eye of the corresponding first and second users. Each of the first and second dedicated displays 120a, 120b is viewable by only the corresponding intended single user. As but one non-limiting example where the co-pilot application is the navigation application, the first dedicated display 120a for the first user (e.g., the driver) can include a first notification symbol that provides navigation instructions for an imminent driving maneuver (e.g., an arrow for an upcoming turn). Furthermore, the common display 110 can include a second notification symbol that overlays a border of a reduced speed limit sign, such that the common display 110 notifies both the driver and the front-seat passenger of the reduced speed limit as the vehicle approaches the upcoming turn. In addition, the second dedicated display 120b of the second single-user viewing device 114b can include a third notification symbol that provides navigation instructions to only the second user (e.g., the front-seat passenger), and these navigation instructions may be associated with one or more driving maneuvers that follow the imminent driving maneuver. It is contemplated that other examples of the collaborative display system can include more or fewer than two single-user viewing devices. It is further contemplated that the first dedicated display 120a, the second dedicated display 120b, and the common display 110 can provide any other suitable information.

Continuing with the previous non-limiting example where the co-pilot application is the navigation application, the vehicle 100 can include one or more input devices 124 for one or more co-pilot applications. Each input device 124 can be configured to generate an input signal indicative of data associated with the one or more users, the vehicle, a road condition, another vehicle, and a Vulnerable Road User (e.g., a pedestrian; a roadway worker; a person operating a wheelchair or other personal mobility device, whether motorized or not; a person operating an electric scooter or similar; and a person operating a bicycle or other nonmotorized means of transportation). More specifically, non-limiting examples of the input devices 124 can include components of a Driver Monitoring System 126 (DMS) for generating the input signal associated with the attention of the driver (e.g., one or more eye tracker devices 116a, 116b, an internally-facing camera 128, and/or other input devices). Non-limiting examples of the input devices 124 can further include on-board devices mounted to the vehicle 100 for generating the input signal associated with movement of the vehicle 100, other vehicles, and/or Vulnerable Road Users (e.g., a radar device 130, a lidar device 132, an externally-facing camera 134, a night-vision camera 136, an infrared camera 138, an ultrasonic device 140, a steering wheel angle sensor 142, a brake sensor 144, a wheel speed sensor 146, an accelerometer 148, an Automated Driving System 150 (ADS), and/or other vehicle systems). Non-limiting examples of the input device 124 can further include off-board devices in the data and communication network 152 [e.g., a cellular network 154, a Dedicated Short-Range Communications (DSRC) network 156, a Vehicle-To-Infrastructure (V2X) network 158, a Global Positioning Satellite (GPS) network 160, a Wi-Fi network 162, a road traffic monitoring network 164, a road database 166, and an Internet network 168]. However, it is contemplated that the input device can include other suitable driver monitoring devices, on-board devices, or off-board devices. It is contemplated that the input signal can be indicative of other suitable parameters of the user, the vehicle, other vehicles, Vulnerable Road Users, and/or road conditions.

The system 104 further includes a road detection module 170 for generating a road signal associated with the road geometry, which is visible through the windshield 102 and located within a field of view of the users. In this non-limiting example, the road detection module 170 can include the radar device 130, the lidar device 132, the externally-facing camera 134, the night-vision camera 136, the infrared camera 138, the ultrasonic device 140, the cellular network 154, the DSRC network 156, the V2X network 158, the GPS network 160, the Wi-Fi network 162, the road traffic monitoring network 164, the road database 166, and/or the Internet network 168. The road signal can be indicative of the road geometry in the form of an intersection between a first road along which the vehicle is currently travelling and a second road, which intersects the first road and is where the navigation application requires the vehicle 100 to make a turn. In other examples, the road signal can be indicative of other road geometry, such as an entrance ramp, an exit ramp, a merging lane, an adjacent lane of traffic and/or other road geometries where the navigation application requires the vehicle 100 to travel.

Figure 2:
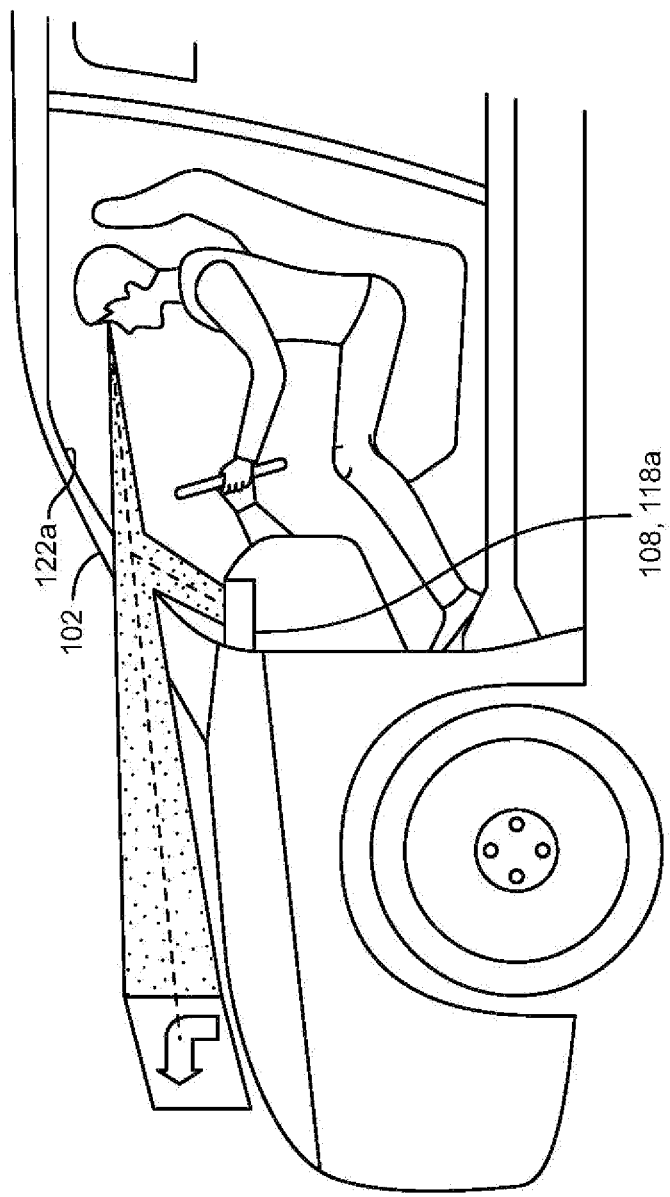
FIG. 2 is an enlarged side view of one portion of the vehicle of FIG. 1, illustrating one of the ARHUDs for projecting a dedicated display adapted to be viewed by one of the users.

Each of the first and second ARHUDs 118a, 118b projects an associated one of first and second dedicated displays 120a, 120b onto first and second dedicated sections 122a, 122b of the windshield 102, which are viewable by an associated one of first and second users (e.g., the driver and the front-seat passenger). The first and second dedicated sections 122a, 122b of the windshield 102 can be positioned directly forward of an associated one of the first and second users and at variable virtual distances from the first and second users. While the first ARHUD 118a is described in detail below and shown in FIG. 2, the second ARHUD 118b is identical to the first ARHUD 118a. The first ARHUD 118a projects the first dedicated display 120a including one or more notification symbols 172 associated with the road condition, in response to the first ARHUD 118a receiving a first dedicated actuation signal from the processor 174 as described in detail below.

Figure 3:
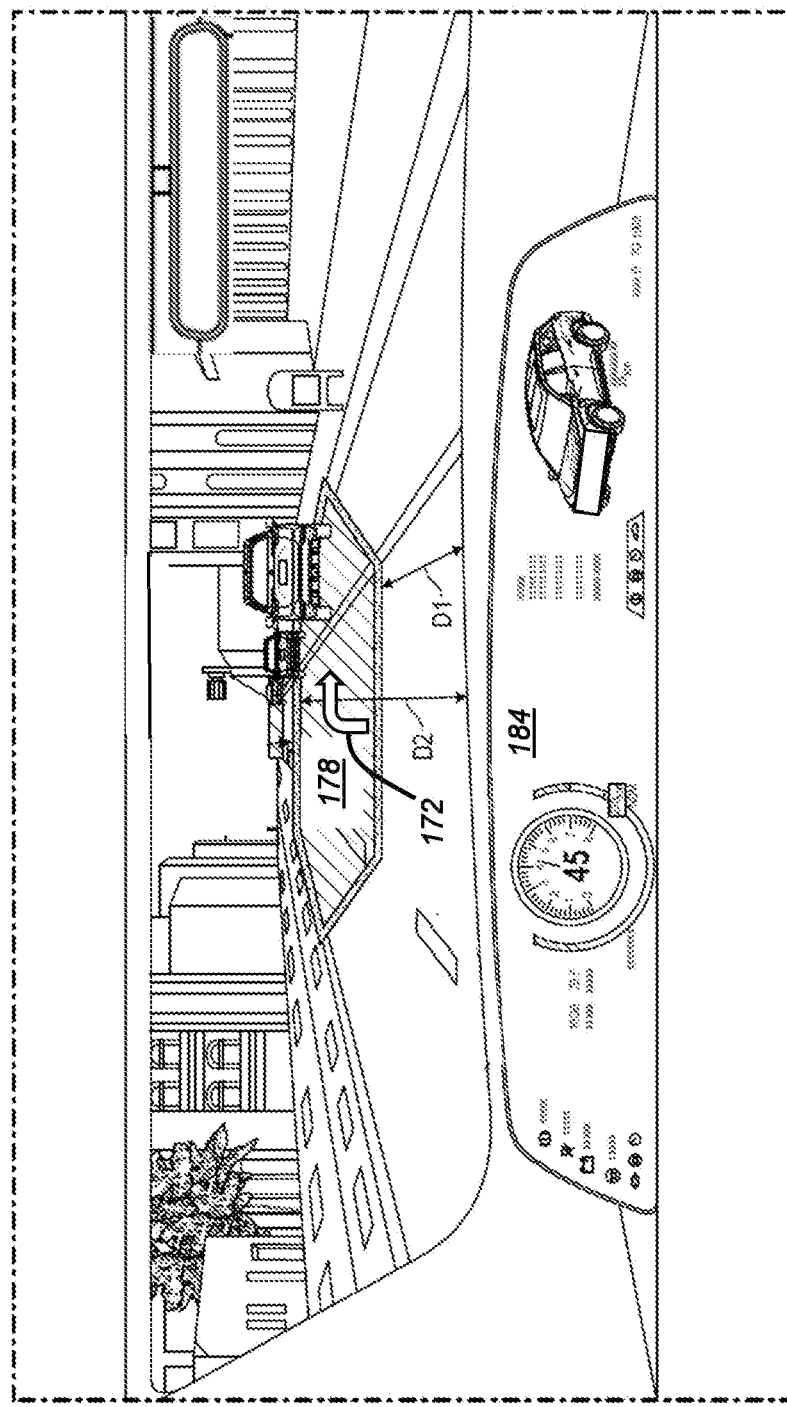
FIG. 3 is a schematic view of one of the ARHUDs of FIG. 1, illustrating the ARHUD including a far-field plane and a near-field plane.

Referring to FIG. 3, the first dedicated display 120a is configured to display the notification symbol 172 upon the windshield 102 within a far-field image plane 178 of the first dedicated section 122a of the windshield 102, where the notification symbol 172 is overlaid at a position upon the windshield 102 that overlays the road geometry associated with the road condition. The far-field image plane 176 contains images overlaid upon the road geometry 160, e.g., the roadway, that is visible through the windshield 102. In the example shown in FIGS. 2 and 3, the far-field image plane 176 only covers a portion of the entire plane of the windshield 102. However, it is contemplated that the far-field image plane may cover the entire plane of the windshield that is not occupied by the near-field image plane 184. Moreover, while FIG. 3 illustrates the far-field image plane spanning across each lane across the roadway, other examples of the far-field image plane can span across only a portion of the lanes that are part of the roadway. The first dedicated display 120a is further configured to display information regarding the notification symbol within a near-field image plane 184 of the first dedicated section 122a of the windshield 102. In addition, the first single-user viewing device 114a further includes the eye tracker device 116a for generating a first user signal associated with the location of the eye of the associated first user, such that the first ARHUD 118a projects the notification symbol 172 onto the first dedicated section 122a of the windshield 102 that overlays the associated road geometry (e.g., an arrow overlaying a current driving lane to instruct the driver to maneuver the vehicle 100 from the current driving lane into an adjacent lane). In other non-limiting examples, the notification symbol 172 can include an animated graphic, a caution symbol, a vehicle icon, an animal icon, a pedestrian icon, and the like.

The EV Display module 108 is configured to project the common display 110 onto a common section 112 of the windshield 102, such that the common display 110 includes one or more common notification symbols concurrently visible to both of the first and second users (e.g., the driver and the front-seat passenger). In this non-limiting example, the common section 112 of the windshield 102 is positioned between the first and second dedicated sections 122a, 122b of the windshield 102 and at a common distance from at least two of the users (e.g., the first and second users 180a, 180b).

Figure 4:
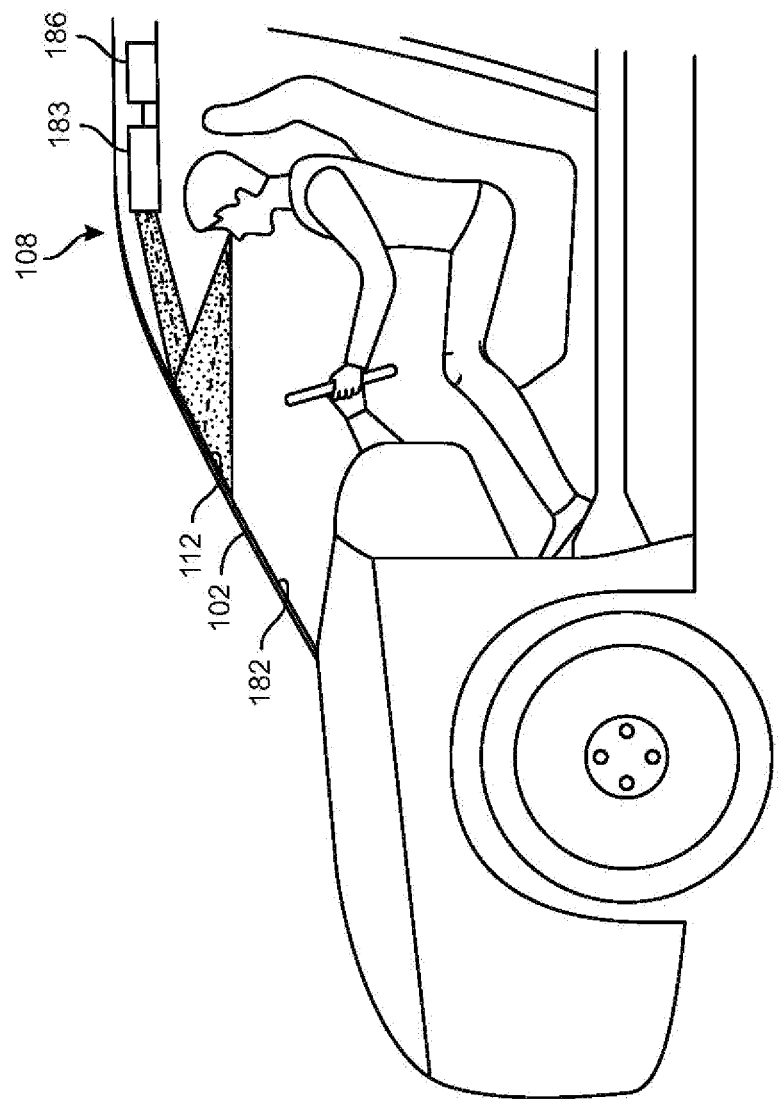
FIG. 4 is an enlarged side view of one portion of the vehicle of FIG. 1, illustrating the EV display for projecting a common display adapted to be viewed by multiple users.

Referring to FIG. 4, one non-limiting example of the EV Display module 108 includes a phosphor film 182 adapted to be applied to the windshield 102 and an ultraviolet laser device 183 (UV laser device) with a microelectromechanical system scanner 186 (MEMS scanner). The UV laser device 184 projects the common display 110 with the common notification symbols onto the phosphor film 182 where the common notification symbols overlay the associated road geometry. In one non-limiting example, the common notification symbol can include brackets overlaid onto the border of a reduced speed limit sign. In other non-limiting examples, the EV Display module 108 is configured to project the common display 110 including first and second colors directed to associated first and second users. The EV Display module 108 is further configured to project the common display 110 including one or more annotations directed to an associated one of the first and second users.

Referring back to FIG. 1, the system 104 further includes a computer 188 having one or more processors 174 electrically communicating with the input devices 124, the first and second single-user viewing devices 114a, 114b, the EV Display module 108, and the road detection module 170. The computer 188 further includes a non-transitory computer readable storage medium 190 (CRM) storing instructions, such that the processor 174 is programmed to receive the input signal from the input devices 124, including the road signal from the road detection module 170 and the first and second user signals from the eye tracker devices 116a, 116b of the first and second single-user viewing devices 114a, 114b. The first and second user signals include perception data associated with the location of a head of the first and second users and the orientation or gaze location of each user's eyes. It is to be appreciated that the user eye and head positions are at a different location than the image capturing devices (e.g., the externally-facing camera 134, the night-vision camera 136, and/or the infrared camera 138), and therefore there may be areas in the environment that the user may view that are not captured by the image capturing devices, and vice versa.

The processor 174 is programmed to determine the first dedicated section 122a of the windshield 102 that overlays the road geometry associated with the road condition, in response to the processor 174 receiving the road signal from the road detection module 170 and the processor 174 further receiving the first user signal from the eye tracker device 116a for the first single-user viewing device 114a. The processor 174 is further programmed to generate the first dedicated actuation signal for the first single-user viewing device, in response to the processor determining the first dedicated section 122a of the windshield 102 and the processor 174 receiving the input signal from the input devices 124.

The first ARHUD 118a projects the first dedicated display 120a onto the first dedicated section 122a, in response to the ARHUD 118 receiving the first dedicated actuation signal from the processor 174. The first ARHUD 118a is configured to generate the first dedicated display including a first notification symbol, in response to the first ARHUD 118a receiving the first dedicated actuation signal from the processor 174. The first notification symbol is associated with the road condition. As shown in FIG. 4, the first dedicated display 120a is configured to display the first notification symbol within a far-field image plane of the windshield 102 and information regarding the first notification symbol within a near-field image plane of the windshield 102.

The processor 174 is programmed to determine the second dedicated section 122b of the windshield 102 that overlays the road geometry associated with the road condition, in response to the processor 174 receiving the road signal from the road detection module 170 and the processor 174 further receiving the second user signal from the eye tracker device 116b for the second single-user viewing device 114b. The processor 174 is further programmed to generate the second dedicated actuation signal for the second single-user viewing device 114b, in response to the processor 174 determining the second dedicated section 122b of the windshield 102 and the processor 174 receiving the input signal from the input devices 124.

The second ARHUD 118b projects the second dedicated display 120b onto the second dedicated section 122b, in response to the second ARHUD 118b receiving the second dedicated actuation signal from the processor 174. The second ARHUD 118b is configured to generate the second dedicated display 120b including a notification symbol, in response to the second ARHUD 118b receiving the second dedicated actuation signal from the processor 174. The notification symbol is associated with the road condition. As shown in FIG. 4, the second dedicated display is configured to display the notification symbol within a far-field image plane of the windshield 102 and information regarding the notification symbol within a near-field image plane of the windshield 102.

The processor 174 is programmed to generate a common actuation signal, in response to the processor 174 receiving the road signal from the road detection module 170 and the processor 174 receiving the input signal from the input devices 124. The EV Display module 108 projects the common display 110 onto the common section 112 of the windshield 102, in response to the EV Display module 108 receiving the common actuation signal from the processor 174.

Figure 5:
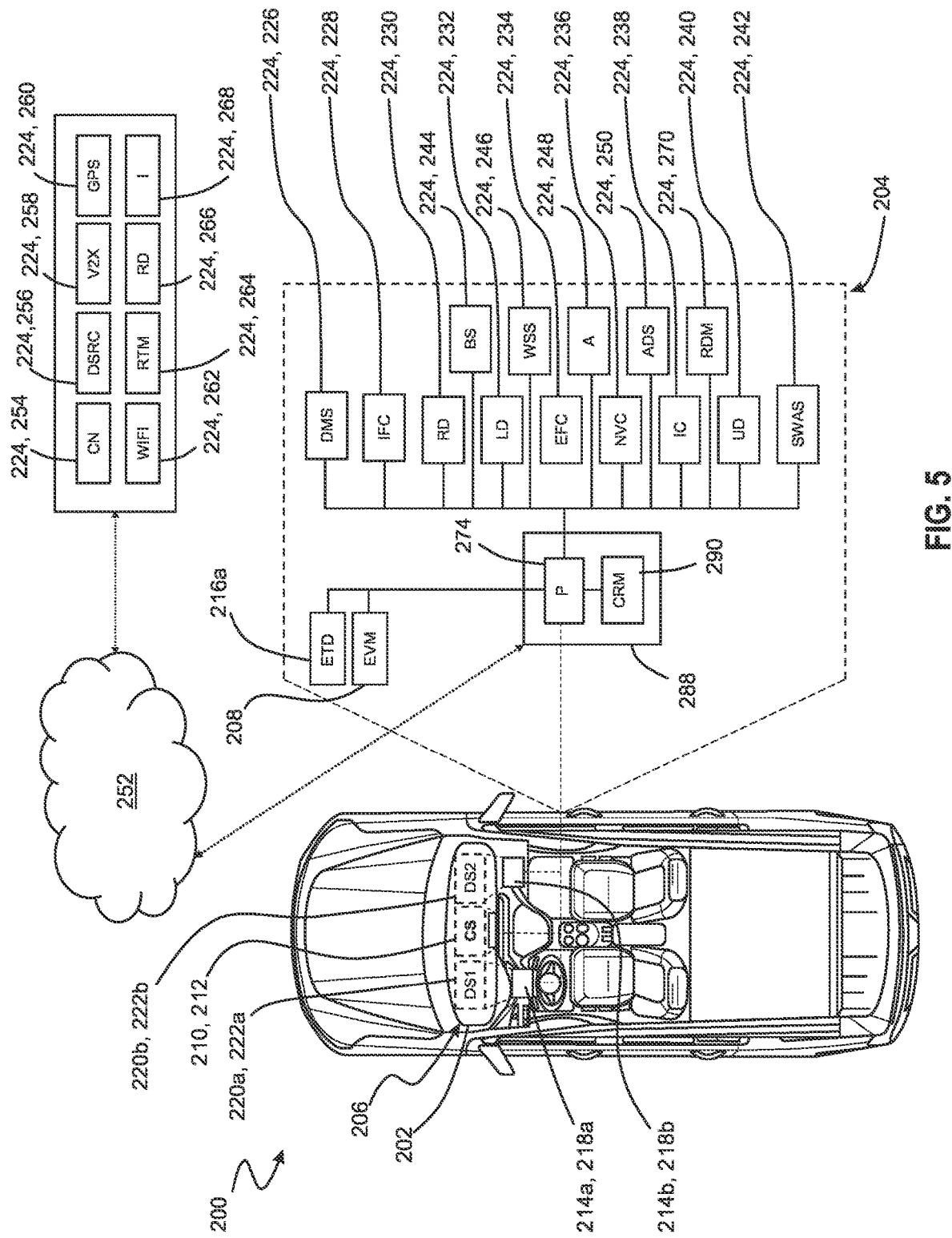
FIG. 5 is a schematic diagram of another example of the vehicle of FIG. 1, illustrating one of the ARHUDs having an eye tracker device and the other one of the ARHUDs without an eye tracker device.

Referring to FIG. 5, another non-limiting example of a vehicle 200 having a collaborative co-pilot system 204 with a multi-view display 206 is similar to the vehicle 100 of FIG. 1 and includes the same components identified by the same numbers increased by 100. However, while the multi-view display device 106 includes the second single-user viewing device 114b with the eye tracker device 116b, the multi-display device 206 includes a second single-user device 214b without an eye tracker device.

Figure 6:
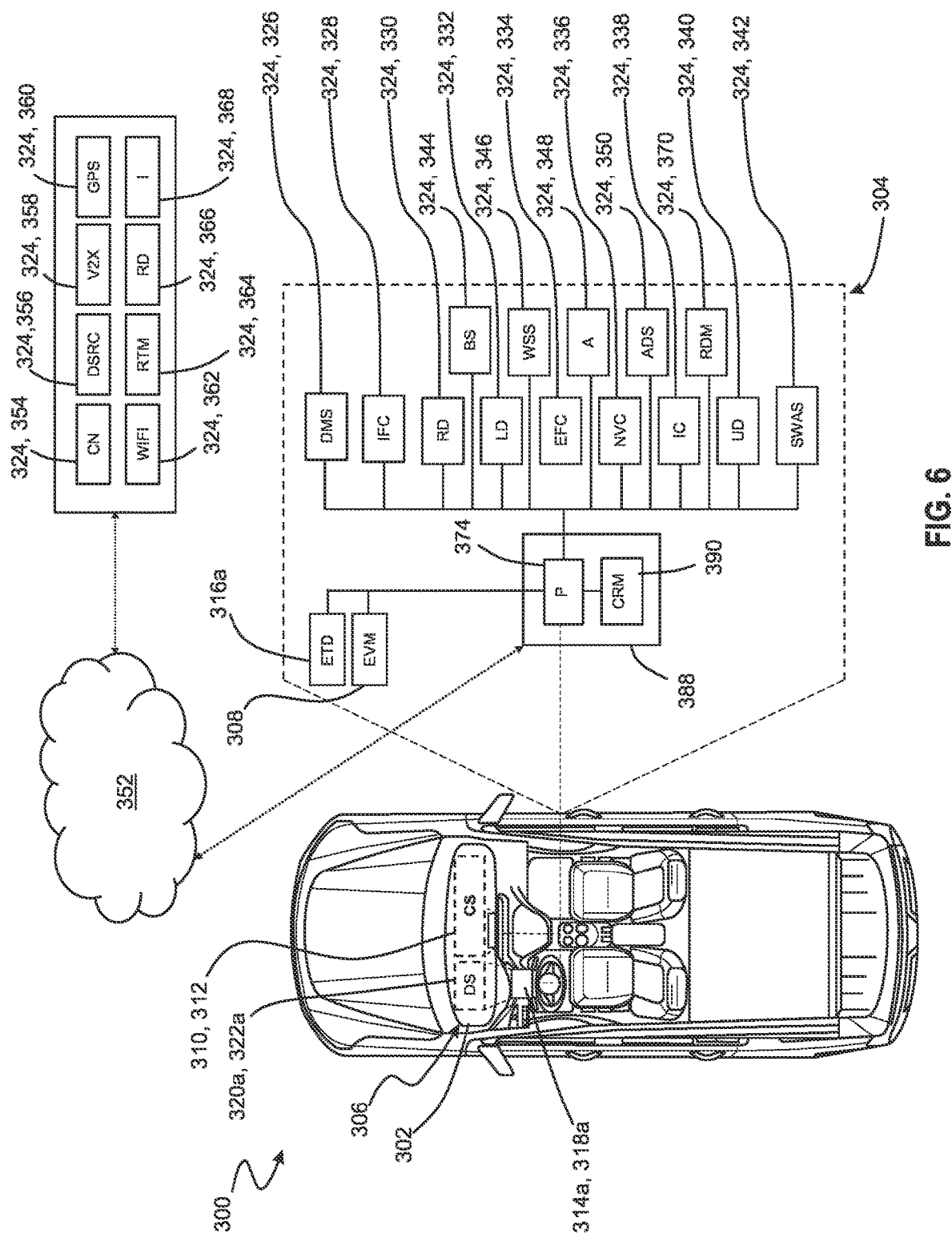
FIG. 6 is a schematic diagram of yet another example of the vehicle of FIG. 1, illustrating the multi-view display system having only on ARHUD for one of the users.

Referring to FIG. 6, yet another non-limiting example of a vehicle 300 having a collaborative co-pilot system 304 with a multi-view device display 306 is similar to the vehicle 100 of FIG. 1 and includes the same components identified by the same numbers increased by 200. However, while the multi-view display device 106 includes the second single-user viewing device 114b, the multi-display device 306 does not include a second single-user device.

Figure 7:
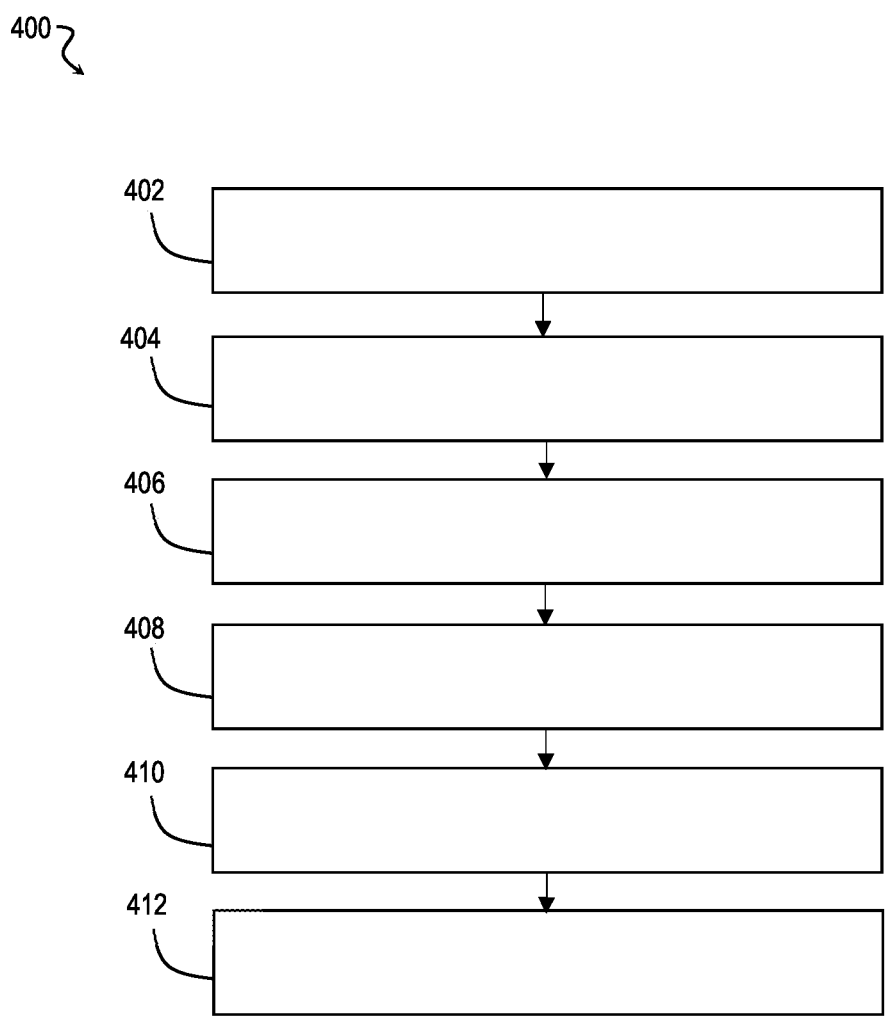
FIG. 7 is a flow chart for one example of a method of operating the collaborative display system for the vehicle of FIG. 1.

Referring now to FIG. 7, a non-limiting example of a method 400 is provided for operating the multi-view display device 106 for the collaborative display system 104 of FIG. 1. The method 400 begins at block 402 with generating, using the input device 124, an input signal associated with a road condition. The method 400 further includes generating, using the eye tracking devices 116a, 116b of the first and second single-user viewing devices 114a, 114b, the first and second user signals associated with a location of an eye of the corresponding first and second users.

At block 404, the method 400 further includes generating, using the road detection module 170, the road signal associated with the road geometry that is visible through the windshield 102 and located within a field of view of the corresponding single users.

At block 406, the method 400 further includes receiving, using the processor 174, the input signal from the input device 124 and the road signal from the road detection module 170. The method 400 further includes receiving, using the processor 174, the first and second user signals from the eye tracker devices 116a, 116b of the associated first and second single-user viewing devices 114a, 114b. The method 400 further includes determining, using the processor 174, the first and second dedicated sections 122a, 122b of the windshield 102 that overlays the road geometry associated with the road condition, in response to the processor 174 receiving the road signal from the road detection module and the processor 174 receiving the first and second user signals from the eye tracker devices 116a, 116b of the first and second single-user viewing devices 114a, 114b.

At block 408, the method 400 further includes generating, using the processor 174, the first and second dedicated actuation signals and the common actuation signal in response to the processor 174 receiving the input signal from the input device 124 and the processor 174 receiving the road signal from the road detection module 170. The method 400 further includes generating, using the processor 174, the first and second dedicated actuation signals based on the processor determining an associated one of the first and second dedicated sections 122a, 122b of the windshield.

At block 410, the method 400 further includes generating, using the first ARHUD 118a and the second ARHUD 118b, an associated one of first and second dedicated displays 120a, 120b associated with the road condition. More specifically, the method 400 can include projecting, using the first and second ARHUDs 118a, 118b, an associated one of the first and second dedicated displays 120a, 120b onto associated first and second dedicated sections 122a, 122b of the windshield 102 that are visible to corresponding single first and second users. The first and second dedicated displays 120a, 120b overlay the road geometry associated with the road condition, in response to the first and second ARHUDs 118a, 118b receiving an associated one of the first and second dedicated actuation signals from the processor 174.

At block 412, the method 400 further includes generating, using the EV Display module 108, the common display 110 associated with the road condition. More specifically, the method 400 includes projecting, using the EV Display module 108, the common display 110 onto a portion of the windshield 102 that is visible to the users including each one of the first and second users, in response to the EV Display module 108 receiving the common actuation signal from the processor 174. More specifically, in this non-limiting example, the method 400 includes projecting, using the EV Display module 108, the common display 110 onto the common section 112 of the windshield 102, with the common section 112 being spaced a common distance from two or more of the users. Also, in this non-limiting example, the method 400 further includes projecting, using the EV Display module 108, the common display 110 including a plurality of colors, with the plurality of colors providing a notification to an associated one of the users. The method 400 can further include projecting, using the EV Display module 108, the common display 110 including one or more annotations for providing a notification directed to one or more of the first and second users.

Non-limiting examples of the vehicle is a land vehicle, such as a sedan, a light duty truck, a heavy duty truck, a sport utility vehicle, a van, or a motor home. The vehicle 100 is an autonomous vehicle, a semi-autonomous vehicle, or a non-autonomous (manual) vehicle. One non-limiting example of the vehicle is an electric vehicle having a propulsion system (e.g., with an electric motor. However, it is contemplated that other non-limiting examples of the vehicle can have other suitable propulsion systems (e.g., with an internal combustion engine, a hybrid engine, a hydrogen-fuel cell, etc.).

The processors may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the processors may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A multi-view display device for a collaborative co-pilot system of a vehicle having a windshield, with the collaborative co-pilot system including at least one input device for generating an input signal indicative of data associated with at least one of the vehicle, a road condition, another vehicle, and a Vulnerable Road User, the multi-view display device comprising:
 a road detection module for generating a road signal associated with a road geometry that is visible through the windshield and located within a field of view of a corresponding single users;
 at least one single-user viewing device comprising:
  an Augmented Reality Head Up Display module (ARHUD) for generating a dedicated display associated with the road condition, the ARHUD for projecting the dedicated display onto a portion of the windshield that is visible to the corresponding single user and overlaying the road geometry associated with the road condition; and
  an eye tracker device for generating a user signal associated with a location of an eye of the corresponding single user;
 an Extended View Display module (EV display module) for generating a common display that is visible to a plurality of users including each one of the single users; and
 a computer including at least one processor electrically communicating with the at least one input device, the at least one single-user viewing device, and the EV display module, where the computer further includes a non-transitory computer readable storage medium storing instructions such that the at least one processor is programmed to:
  receive the input signal from the at least one input device;
  receive the user signal from the eye tracker device;
  determine a dedicated section of the windshield overlaying the road geometry associated with the road condition in response to the at least one processor receiving the road signal from the road detection module and the user signal from the eye tracker device;
  generate a dedicated actuation signal and a common actuation signal in response to the at least one processor receiving the input signal from the at least one input device; and
  generate the dedicated actuation signal in further response to the at least one processor determining the dedicated section of the windshield overlaying the road geometry;
 wherein the ARHUD projects the dedicated display onto the dedicated section of the windshield overlaying the associated road geometry in response to the ARHUD receiving the dedicated actuation signal from the at least one processor; and
 wherein the EV display module projects the common display onto the windshield in response to the EV display module receiving the common actuation signal from the at least one processor.

2. The multi-view display device of claim 1 wherein the ARHUD is configured to generate the dedicated display including a notification symbol in response to the ARHUD receiving the dedicated actuation signal from the at least one processor, wherein the notification symbol is associated with the road condition, wherein the dedicated display is configured to display the notification symbol within a far-field image plane of the windshield and information regarding the notification symbol within a near-field image plane of the windshield.

3. The multi-view display device of claim 2 wherein the EV display module is configured to project the common display including first and second colors directed to associated first and second users of the plurality of users.

4. The multi-view display device of claim 2 wherein the EV display module is configured to project the common display including at least one annotation directed to one of the users.

5. The multi-view display device of claim 4 wherein the EV display module comprises:
 a phosphor film adapted to be applied to the windshield; and an ultraviolet laser device (UV laser device) with a microelectromechanical system scanner (MEMS scanner), with the UV laser device projecting the common display onto the phosphor film.

6. A collaborative co-pilot system of a vehicle, the collaborative co-pilot system comprising:
a windshield of the vehicle;
at least one input device for generating an input signal indicative of data associated with at least one of the vehicle, a road condition, another vehicle, and a Vulnerable Road User; and
a multi-view display device comprising:
a road detection module for generating a road signal associated with a road geometry that is visible through the windshield and located within a field of view of a corresponding single user;
at least one single-user viewing device comprising:
an Augmented Reality Head Up Display module (ARHUD) for generating a dedicated display associated with the road condition, the ARHUD for projecting the dedicated display onto a portion of the windshield that is visible to the corresponding single user and overlaying the road geometry associated with the road condition;
an eye tracker device for generating a user signal associated with a location of an eye of the corresponding single user;
an Extended View Display module (EV display module) for generating a common display that is visible to a plurality of users including each one of the single users; and
a computer including at least one processor electrically communicating with the at least one input device, the at least one single-user viewing device, and the EV display module, where the computer further includes a non-transitory computer readable storage medium storing instructions such that the at least one processor is programmed to:
receive the input signal from the at least one input device; and
receive the user signal from the eye tracker device;
determine a dedicated section of the windshield overlaying the road geometry associated with the road condition in response to the at least one processor receiving the road signal from the road detection module and the user signal from the eye tracker device;
generate a dedicated actuation signal and a common actuation signal in response to the at least one processor receiving the input signal from the at least one input device;
generate the dedicated actuation signal in further response to the at least one processor determining the section of the windshield overlaying the road geometry;
wherein the ARHUD projects the dedicated display onto the section of the windshield overlaying the associated road geometry in response to the ARHUD receiving the dedicated actuation signal from the at least one processor; and
wherein the EV display module projects the common display onto the windshield in response to the EV display module receiving the common actuation signal from the at least one processor.

7. The collaborative co-pilot system of claim 6 wherein the EV display module is configured to display the common project on a common section of the windshield that is spaced a common distance from at least two of the users.

8. The collaborative co-pilot system of claim 7 wherein the ARHUD is configured to generate the dedicated display including a notification symbol in response to the ARHUD receiving the dedicated actuation signal from the at least one processor, wherein the notification symbol is associated with the road condition, wherein the dedicated display is configured to display the notification symbol within a far-field image plane of the windshield and information regarding the notification symbol within a near-field image plane of the windshield.

9. The collaborative co-pilot system of claim 8 wherein the EV display module is configured to project the common display including first and second colors directed to associated first and second users of the plurality of users.

10. The collaborative co-pilot system of claim 8 wherein the EV display module is configured to project the common display including at least one annotation directed to one of the users.

11. The collaborative co-pilot system of claim 10 wherein the EV display module comprises:
a phosphor film adapted to be applied to the windshield; and
an ultraviolet laser device (UV laser device) with a microelectromechanical system scanner (MEMS scanner), with the UV laser device projecting the common display onto the phosphor film.

12. A method of operating a multi-view display device for a collaborative co-pilot system of vehicle, the collaborative co-pilot system including a windshield, at least one input device, and a multi-view display device, the multi-view display device including at least one single-user viewing device having an Augmented Reality Head Up Display module (ARHUD), the multi-view display device further including an Extended View Display module (EV display module) and a computer having at least one processor and a non-transitory computer readable storage medium storing instructions, the method comprising:
generating, using the at least one input device, an input signal indicative of data associated with at least one of the vehicle, a road condition, another vehicle, and a Vulnerable Road User;
generating, using a road detection module, a road signal associated with a road geometry that is visible through the windshield and located within a field of view of a corresponding single user;
generating, using the ARHUD, a dedicated display associated with the road condition;
generating, using an eye tracker device of the single-user viewing device, a dedicated user signal associated with a location of an eye of the corresponding single user;
generating, using the EV display module, a common display associated with the road condition;
receiving, using the at least one processor, the input signal from the at least one input device;
determining, using the at least one processor, a dedicated section of the windshield overlaying the road geometry associated with the road condition in response to the at least one processor receiving the road signal from the road detection module and the user signal from the eye tracker device;
generating, using the at least one processor, a dedicated actuation signal and a common actuation signal in response to the at least one processor receiving the input signal from the at least one input device;

generating, using the at least one processor, the dedicated actuation signal in further response to the at least one processor determining the dedicated section of the windshield overlaying the road geometry;

projecting, using the ARHUD, the dedicated display onto the dedicated section of the windshield overlaying the associated road geometry associated with the road condition in response to the ARHUD receiving the dedicated actuation signal from the at least one processor; and projecting, using the EV display module, the common display onto a portion of the windshield that is visible to a plurality of users including each one of the single users, in response to the EV display module receiving the common actuation signal from the at least one processor.

13. The method of claim 12 further comprising displaying, using the EV display module, the common display on a common section of the windshield spaced a common distance from at least two of the plurality of users.

14. The method of claim 13 further comprising at least one of:

projecting, using the EV display module, the common display including a plurality of colors, with the plurality of colors providing a notification to an associated one of the users; and projecting, using the EV display module, the common display including at least one annotation for providing a notification directed to one of the users.

15. The multi-view display device of claim 1 wherein the at least one single-user viewing device includes first and second single-user-viewing devices, with each of the first and second single-user-viewing devices generating an associated one of first and second dedicated displays onto an associated one of first and second dedicated sections of the windshield, and with each of the first and second single-user-viewing devices being viewable by a corresponding one of first and second users, where the first dedicated display includes a first notification symbol for providing a first navigation instruction to only the first user, with the first navigation instruction indicating an imminent first driving maneuver.

16. The multi-view display device of claim 15 wherein the common display includes a second notification symbol that overlays a border of a speed limit sign such that the common display notifies both the first and second users of the speed limit, and the second dedicated display includes a third notification symbol for providing a second navigation instruction to only the second user, with the second navigation instruction indicating a second driving maneuver that follows the imminent first driving maneuver.

17. The collaborative co-pilot system of claim 6 wherein the at least one single-user viewing device includes first and second single-user-viewing devices, with each of the first and second single-user-viewing devices generating an associated one of first and second dedicated displays onto an associated one of first and second dedicated sections of the windshield, and with each of the first and second single-user-viewing devices being viewable by a corresponding one of first and second users, where the first dedicated display includes a first notification symbol for providing a first navigation instruction to only the first user, with the first navigation instruction indicating an imminent first driving maneuver.

18. The collaborative co-pilot system of claim 17 wherein the common display includes a second notification symbol that overlays a border of a speed limit sign such that the common display notifies both the first and second users of the speed limit, and the second dedicated display includes a third notification symbol for providing a second navigation instruction to only the second user, with the second navigation instruction indicating a second driving maneuver that follows the imminent first driving maneuver.

19. The method of claim 12 wherein the at least one single-user viewing device includes first and second single-user-viewing devices, with each of the first and second single-user-viewing devices generating an associated one of first and second dedicated displays onto an associated one of first and second dedicated sections of the windshield, and with each of the first and second single-user-viewing devices being viewable by a corresponding one of first and second users, where the first dedicated display includes a first notification symbol for providing a first navigation instruction to only the first user, with the first navigation instruction indicating an imminent first driving maneuver.

20. The method of claim 19 wherein the common display includes a second notification symbol that overlays a border of a speed limit sign such that the common display notifies both the first and second users of the speed limit, and the second dedicated display includes a third notification symbol for providing a second navigation instruction to only the second user, with the second navigation instruction indicating a second driving maneuver that follows the imminent first driving maneuver.

\* \* \* \* \*